June 22, 1965
R. C. ROBBINS
3,190,677
CLEVIS WITH SPRING-OPERATED PIN
Filed April 8, 1964
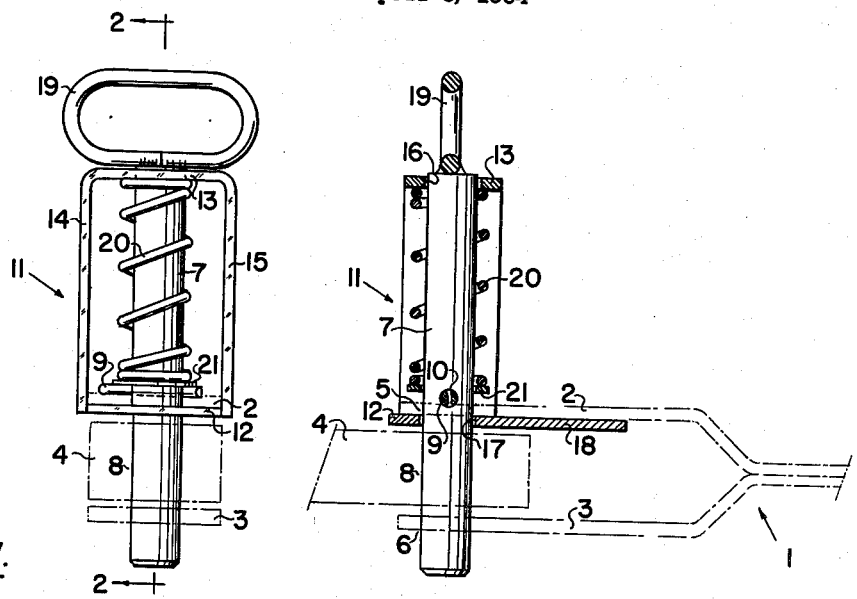
FIG. 1.
FIG. 2.
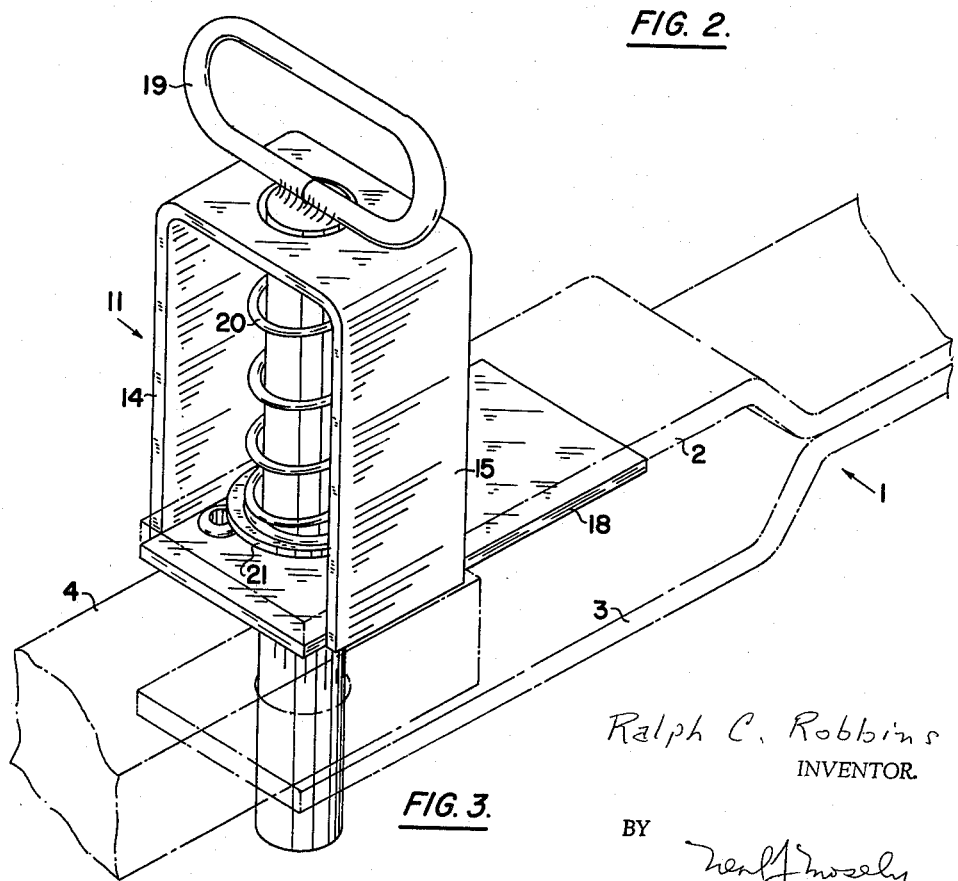
FIG. 3.
Ralph C. Robbins
INVENTOR.
BY
HIS ATTORNEY 3,190,677
CLEVIS WITH SPRING-OPERATED PIN
Ralph C. Robbins, R.R. 1, Cissna Park, Ill.
Filed Apr. 8, 1964, Ser. No. 358,190
4 Claims. (Cl. 280—515)

This invention relates to new and useful improvements in coupling devices and more particularly to a new and improved clevis having a spring-operated pin.

In the coupling devices and clevises of the prior art it is known to provide a spring-operated pin for the clevis. However, the spring-operated pin, in all cases, has been permanently affixed to an arm of the clevis and is not readily assembled and disassembled. In some cases, the framework supporting the spring-operated pin is bolted or even welded to the clevis arm. As a result, there has been a need for a spring-operated pin arrangement for clevises on wagons or tractors which can be easily positioned on one arm of the clevis and held securely in position while providing free movement for the spring-operated pin.

Accordingly, it is one object of this invention to provide a new and improved clevis or coupling having a spring-operated pin.

Another object of this invention is to provide a spring-operated pin arrangement for assembly on one arm of a clevis or coupling to provide a spring-operated pin connection between the clevis or coupling and a drawbar or other apertured traction member.

Still another object of this invention is to provide a novel spring-operated pin mechanism which is easily assembled on and removed from one of the arms of a traction clevis.

A feature of this invention is the provision of a new and improved clevis and pin combination in which the pin is held in position by a spring which also functions to hold the guide frame for the pin on one arm of the clevis with which the pin is associated.

Other objects and features of this invention will become apparent from time to time throughout the specification and claims as hereinafter related.

In the accompanying drawings, to be taken as a part of this specification, there is clearly and fully illustrated a preferred embodiment of this invention, in which drawings FIG. 1 is a view in elevation of a spring-operated pin and supporting frame therefor used in combination with a traction clevis and showing the clevis and drawbar in dotted lines, FIG. 2 is a sectional view taken on the line 2—2 of FIG. 1 and showing the relationship between the spring-operated pin, its supporting frame, and the clevis drawbar with which the pin is used, and FIG. 3 is an isometric view of the supporting frame and spring operated pin shown in FIGURES 1 and 2 and showing its relationship to a clevis and drawbar with which it is to be used.

In the embodiment of this invention set forth in the drawings, my invention is shown in the form of a supporting frame and spring-operated pin supported on a traction clevis and used in association with a drawbar or other apertured traction device. The traction clevis can be part of the tongue of a wagon and the drawbar the traction member of a tractor or other suitable pulling device.

Any functional equivalent of the drawbar, such as a chain, or the like, could also be used in association with this invention.

A clevis 1 is shown in dotted lines in each of the figures and is preferably formed of a sheet metal. Clevis 1 has upper and lower arms 2 and 3 into which fits a drawbar 4 to be secured in position. Arms 2 and 3 of clevis 1 have apertures at 5 and 6 through which pin 7 extends. Pin 7 extends through apertures 5 and 6 in clevis 1 and through an aperture positioned at 8 in drawbar 4. Pin 7 has a retaining pin 9 extending through a laterally extending aperture 10 therein.

Pin 9 is supported in frame 11 which has lower and upper walls 12 and 13 and upwardly extending sidewalls 14 and 15. Pin 7 extends through aperture 16 in upper wall 13 and aperture 17 in lower wall 12. Lower wall 12 has an extended portion 18 extending along the under side of arm 2 of clevis 1 to steady supporting frame 11 against movement. At the upper end of pin 7 there is provided a suitable handle 19 which limits movement of pin 7 through frame 11 and aligned apertures 16 and 17 and is used in moving the pin 7. A suitable spring means, preferably a helical spring 20 is coiled around pin 7 and engages washer 21 resting on retaining pin 9. Spring 20 engages washer 21 at one end and the underside of upper wall 13 at the other end.

The arrangement of parts in this invention permit the frame 11 to be slipped over one arm of clevis 1 and pin 7 and spring 20 quickly assembled therein with spring 20 engaging washer 21 and retaining pin 9 to hold the pin against loss from the clevis. Spring 20 performs the dual function of securing pin 7 and supporting frame 11 tightly on arm 2 of clevis 1. When handle 19 is pulled upward a drawbar 4 or chain or other suitable apertured traction device may be inserted into clevis 1 with its aperture aligned with the apertures in the clevis and upon release of handle 19 is secured in place by coupling pin 7.

From the foregoing description it is seen that the components of this invention cooperate to provide an economical coupling means which is spring-operated and readily assembled on any traction clevis.

While I have described fully and completely one preferred embodiment of this invention as required by the patent laws, I wish it to be understood that within the scope of the appended claims this invention can be practiced otherwise than as specifically described herein.

What is claimed is:

1. In combination, a bifurcated clevis having aligned apertures in each arm thereof, an enclosed frame removably positioned on one arm of said clevis, said frame having a bottom wall positioned under said one arm with an aperture aligned with the aperture therein, said frame having at least one upwardly extending sidewall joining a top wall having an aperture aligned with the apertures in said clevis, a pin movably positioned in the apertures in said frame and said clevis, a retaining member in said pin positioned above said one arm and within said frame, spring means positioned within said frame between said retaining member and the top wall of said frame, and said spring means urging said pin and said frame in opposite directions against said one arm of said clevis to hold said frame and pin securely thereon.

2. In combination, a bifurcated clevis having aligned apertures in each arm thereof, an enclosed frame removably positioned on one arm of said clevis, said frame having a bottom wall positioned under said one arm with an aperture aligned with the aperture therein, said frame having at least one upwardly extending sidewall joining a top wall having an aperture aligned with the apertures in said clevis, a pin movably positioned in the apertures in said frame and said clevis and having a handle at one end limiting movement through said apertures, a retaining member in said pin positioned above said one arm and within said frame, spring means positioned within said frame between said retaining member and the top wall of said frame, said spring means urging said pin and said frame in opposite directions against said one arm of said clevis to hold said frame and pin securely thereon, and said pin being movable by said handle to a position permitting insertion of a drawbar into said clevis.

3. In combination, a bifurcated clevis having aligned apertures in each arm thereon, an enclosed frame removably positioned on one arm of said clevis, said frame having a bottom wall positioned under said one arm with an aperture aligned with the aperture therein, said frame having at least one upwardly extending sidewall joining a top wall having an aperture aligned with the apertures in said clevis, a pin movably positioned in the apertures in said frame and said clevis and having a handle at one end limiting movement through said apertures, a retaining pin extending through a laterally extending aperture in said clevis pin, a helical spring surrounding said clevis pin and operatively engaging said retaining pin at one end and the top wall of said frame at the other end, said helical spring urging said pin and said frame in opposite directions against said one arm of said clevis to hold said frame and pin securely thereon, and said pin being movable by said handle against the force of said helical spring to a position permitting insertion of a drawbar into said clevis.

4. In combination, a bifurcated clevis comprising a pair of sheet metal arms having aligned apertures in each arm, an enclosed sheet metal frame substantially rectangular in cross section and removably positioned on one arm of said clevis, said frame having a bottom wall with an elongated extension extending along the under side of one arm of said clevis and having an aperture aligned with the aperture in said clevis arm, said frame having at least one upwardly extending sidewall joining a top wall having an aperture aligned with the apertures in said clevis, a pin movably positioned in the apertures in said frame and said clevis having a handle at the upper end for movement of said pin and limiting movement through said apertures, a retaining pin extending through a laterally extending aperture in said clevis pin and positioned above said one arm of said clevis and within said frame, a helical spring surrounding said clevis pin and operatively engaging said retaining pin at one end and the top wall of said frame at the other end, said helical spring urging said clevis pin and said frame in opposite directions against said one arm of said clevis to hold said frame and pin securely thereon, and said clevis pin being movable by said handle against the force of said helical spring to a position permitting insertion of a drawbar into said clevis.

References Cited by the Examiner
UNITED STATES PATENTS

| | | |
|---|---|---|
| 1,403,655 | 1/22 | Tirrill. |
| 2,140,132 | 12/38 | Hollett _____ 280—515 X |
| 3,146,003 | 8/64 | De Ronde _____ 280—515 |

FOREIGN PATENTS 508,455    12/54    Canada.

References Cited by the Applicant
UNITED STATES PATENTS

| | | |
|---|---|---|
| 1,612,589 | 12/26 | Laird. |
| 1,887,054 | 11/32 | Wood. |
| 2,140,132 | 12/38 | Hollett. |
| 2,367,874 | 1/45 | Kelley. |
| 2,430,143 | 11/47 | Rutter. |
| 2,478,736 | 8/49 | Balzer. |
| 2,482,907 | 9/49 | Hagen. |
| 2,525,471 | 10/50 | Balzer. |
| 2,665,144 | 1/54 | Birdwell. |
| 3,046,037 | 7/62 | Cain. |

A. HARRY LEVY, *Primary Examiner.*

PHILIP ARNOLD, *Examiner.*